United States Patent
Awoniyi-Oteri et al.

(10) Patent No.: US 11,864,210 B2
(45) Date of Patent: Jan. 2, 2024

(54) USER EQUIPMENT (UE)-ASSISTED SEMI-PERSISTENT SCHEDULING (SPS) AND HYBRID AUTOMATIC REPEAT REQUEST (HARQ)-FEEDBACK SKIPPING FOR UE TRIGGERED DOWNLINK (DL) TRANSMISSIONS

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Jelena Damnjanovic, Del Mar, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/444,474

(22) Filed: Aug. 4, 2021

(65) Prior Publication Data
US 2023/0037847 A1 Feb. 9, 2023

(51) Int. Cl.
*H04W 4/00* (2018.01)
*H04W 72/51* (2023.01)
(Continued)

(52) U.S. Cl.
CPC ........... *H04W 72/51* (2023.01); *H04L 1/1812* (2013.01); *H04L 1/1893* (2013.01); *H04W 72/21* (2023.01)

(58) Field of Classification Search
CPC ............................ H04L 1/1812; H04L 1/1893
See application file for complete search history.

(56) References Cited

U.S. PATENT DOCUMENTS

2013/0322343 A1* 12/2013 Seo ................. H04W 24/02
370/328
2018/0279357 A1* 9/2018 Zacharias ............ H04W 76/30
(Continued)

FOREIGN PATENT DOCUMENTS

| CA | 3029227 A1 * | 7/2019 | ........... H04B 7/0626 |
| WO | WO-2013120253 A1 | 8/2013 | |
| WO | WO-2022222144 A1 * | 10/2022 | |

OTHER PUBLICATIONS

International Search Report and Written Opinion—PCT/US2022/073464—ISA/EPO—dated Oct. 17, 2022.

*Primary Examiner* — Chi H Pham
*Assistant Examiner* — Elisabeth Benoit Magloire
(74) *Attorney, Agent, or Firm* — Norton Rose Fulbright US LLP

(57) ABSTRACT

This disclosure provides systems, methods, and devices for wireless communication that support mechanisms for semi-persistent scheduling (SPS) and hybrid automatic repeat request (HARQ) feedback skipping for user equipment (UE)-initiated transmissions. A UE configured for extended reality (XR) operations and an SPS configuration including a plurality of SPS occasions, each SPS occasion configured with at least one downlink resource and at least one uplink resource, collects pose information related to at least one SPS occasion. The UE determines, based on the pose information, to skip at least one SPS occasion. The UE sends an indication of the determination to skip the at least one SPS occasion to a base station. The indication is transmitted in a preconfigured uplink resource or may be piggybacked in an uplink transmission. The base station may reallocate the resources configured for the at least one SPS occasion based on receiving the indication.

38 Claims, 11 Drawing Sheets

600

602 — Determine, based on pose information associated with the UE, to skip at least one semi-persistent scheduling (SPS) occasion configured for the UE with at least one downlink resource and at least one uplink resource 604 — Transmit, to a base station, an indication of the determination to skip the at least one SPS occasion

(51) Int. Cl.
*H04W 72/21* (2023.01)
*H04L 1/1812* (2023.01)
*H04L 1/1867* (2023.01)

(56) References Cited

U.S. PATENT DOCUMENTS

| | | | |
|---|---|---|---|
| 2019/0029033 A1 | 1/2019 | Tang et al. | |
| 2019/0200382 A1* | 6/2019 | Dudda | H04L 1/1896 |
| 2019/0245657 A1* | 8/2019 | Lee | H04L 1/1835 |
| 2020/0120466 A1* | 4/2020 | Rajagopal | H04L 67/12 |
| 2021/0274526 A1* | 9/2021 | Shin | H04L 1/1896 |
| 2021/0282164 A1* | 9/2021 | Zhou | H04L 1/1819 |
| 2022/0038218 A1* | 2/2022 | Kim | H04L 5/0048 |
| 2022/0038243 A1* | 2/2022 | Shrestha | H04L 1/08 |
| 2022/0045799 A1* | 2/2022 | Jardel | H04L 1/1812 |
| 2022/0053530 A1* | 2/2022 | Ahmed | H04W 72/1273 |
| 2022/0248446 A1* | 8/2022 | Zewail | H04W 72/23 |
| 2022/0321270 A1* | 10/2022 | Yang | H04L 1/1893 |
| 2022/0394731 A1* | 12/2022 | Zhang | H04W 72/23 |
| 2023/0093477 A1* | 3/2023 | El Hamss | H04L 1/1861 |

* cited by examiner

USER EQUIPMENT (UE)-ASSISTED SEMI-PERSISTENT SCHEDULING (SPS) AND HYBRID AUTOMATIC REPEAT REQUEST (HARQ)-FEEDBACK SKIPPING FOR UE TRIGGERED DOWNLINK (DL) TRANSMISSIONS

TECHNICAL FIELD

Aspects of the present disclosure relate generally to wireless communication systems, and more particularly, to semi-persistent scheduling (SPS) and hybrid automatic repeat request (HARQ)-feedback transmissions.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes determining, based on pose information associated with the UE, to skip at least one semi-persistent scheduling (SPS) occasion configured for the UE with at least one downlink resource and at least one uplink resource, and transmitting, to a base station, an indication of the determination to skip the at least one SPS occasion.

In an additional aspect of the disclosure, a method of wireless communication performed by a base station includes receiving, from a UE, an indication of a determination by the UE to skip at least one SPS occasion configured for the UE with at least one downlink resource and at least one uplink resource, and determining, based on the indication of the determination by the UE to skip the at least one SPS occasion, to reallocate the at least one downlink resource and the at least one uplink resource.

In an additional aspect of the disclosure, a UE includes at least one processor and a memory coupled to the at least one processor. The at least one processor stores processor-readable code that, when executed by the at least one processor, is configured to perform operations including determining, based on pose information associated with the UE, to skip at least one SPS occasion configured for the UE with at least one downlink resource and at least one uplink resource, and transmitting, to a base station, an indication of the determination to skip the at least one SPS occasion.

In an additional aspect of the disclosure, a base station includes at least one processor and a memory coupled to the at least one processor. The at least one processor stores processor-readable code that, when executed by the at least one processor, is configured to perform operations including receiving, from a UE, an indication of a determination by the UE to skip at least one SPS occasion configured for the UE with at least one downlink resource and at least one uplink resource, and determining, based on the indication of the determination by the UE to skip the at least one SPS occasion, to reallocate the at least one downlink resource and the at least one uplink resource.

In an additional aspect of the disclosure, a non-transitory computer-readable medium stores instructions that, when executed by a processor, cause the processor to perform operations. The operations include determining, based on pose information associated with the UE, to skip at least one SPS occasion configured for the UE with at least one downlink resource and at least one uplink resource, and transmitting, to a base station, an indication of the determination to skip the at least one SPS occasion.

In an additional aspect of the disclosure, a non-transitory computer-readable medium stores instructions that, when executed by a processor, cause the processor to perform operations. The operations include receiving, from a UE, an indication of a determination by the UE to skip at least one SPS occasion configured for the UE with at least one downlink resource and at least one uplink resource, and determining, based on the indication of the determination by the UE to skip the at least one SPS occasion, to reallocate the at least one downlink resource and the at least one uplink resource.

In an additional aspect of the disclosure, an apparatus includes means for determining, based on pose information associated with the UE, to skip at least one SPS occasion configured for the UE with at least one downlink resource and at least one uplink resource, and means for transmitting, to a base station, an indication of the determination to skip the at least one SPS occasion.

In an additional aspect of the disclosure, an apparatus includes means for receiving, from a UE, an indication of a determination by the UE to skip at least one SPS occasion configured for the UE with at least one downlink resource and at least one uplink resource, and means for determining, based on the indication of the determination by the UE to skip the at least one SPS occasion, to reallocate the at least one downlink resource and the at least one uplink resource.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
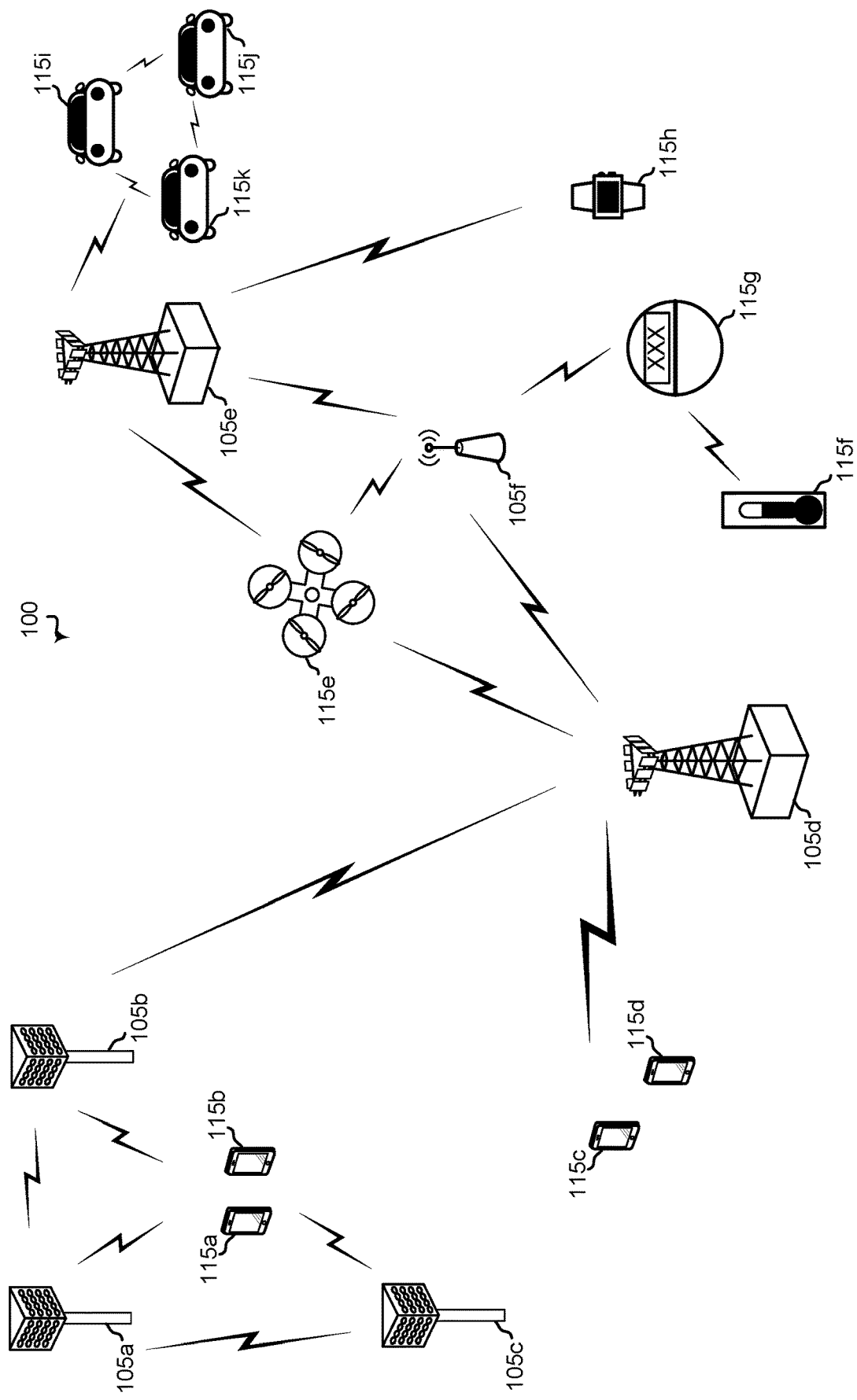
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface.

To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., —99.9999% reliability), ultra-low latency (e.g., — 1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
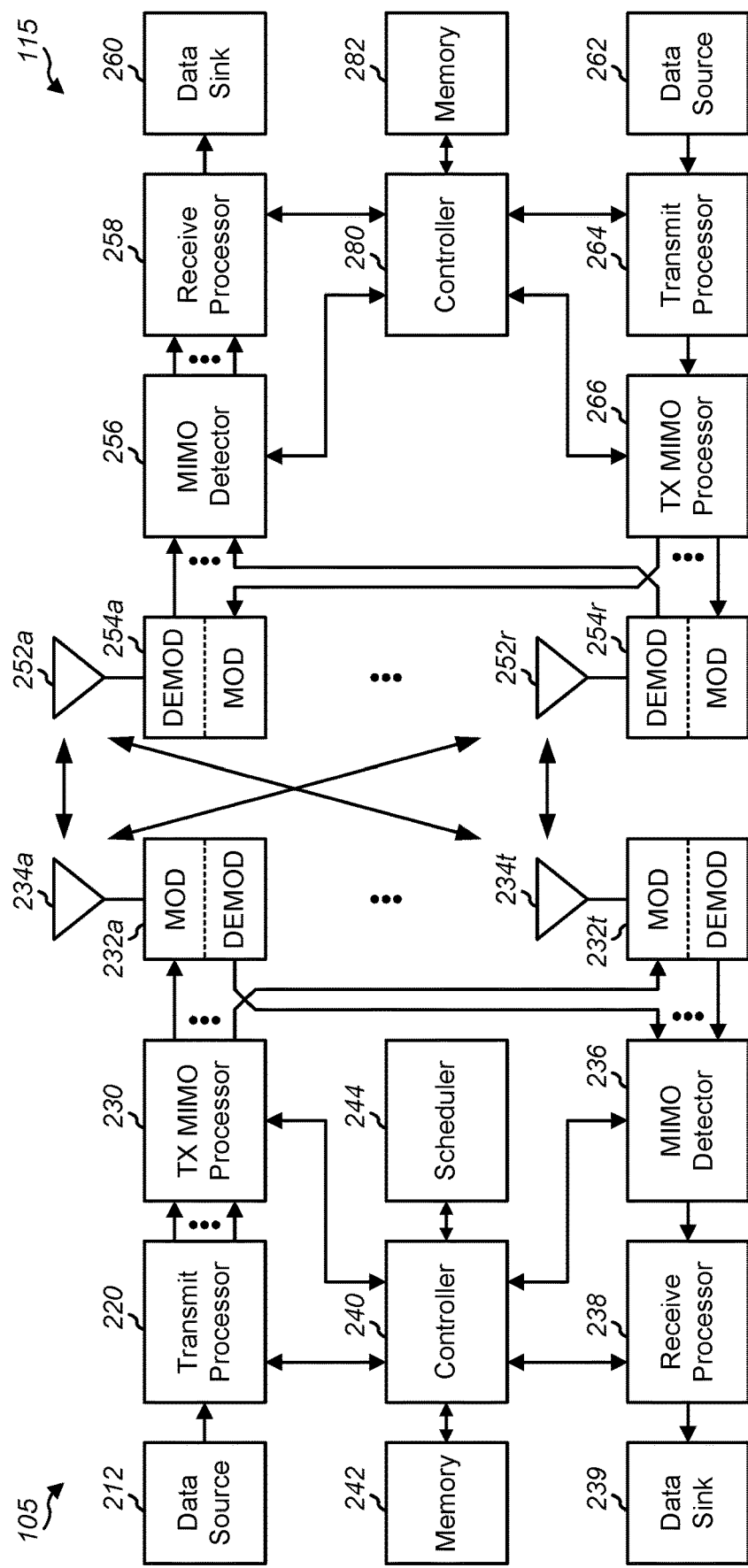
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 6 and 7, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current wireless communication systems may implement extended reality (XR), which may include augmented reality (AR), virtual reality (VR), mixed reality (MR), etc. In XR implementations, an XR environment may be rendered and presented (e.g., displayed) to a user using a display of a UE (e.g., a device configured for XR capabilities, such as a wireless communication device). Rendering the XR environment may include rendering at least one view of at least a portion of the XR portion and then presenting the at least view to the user. The at least one view of the XR environment may represent a portion of the XR environment visible to the user based on the pose information of the UE with respect to the XR environment. In aspects, pose information may include any one of location, position, and/or orientation information, or a combination of them. For example, when the location and orientation of the UE with respect to an XR environment indicates that the user's viewpoint may be pointed to a particular portion of the XR environment, a view of the particular portion of the XR environment may be rendered and displayed to the user using the UE. If the location, position, and/or orientation of the UE changes, which may indicate that the user's viewpoint with respect to an XR environment has changed and may be pointed to a different portion of the XR environment, a view of the different portion of the XR environment may be rendered and displayed to the user using the UE. In this manner, the view rendered and presented to the user via the UE may depend on the location, position, and/or orientation of the UE with respect to the rendered XR environment.

In some implementations of XR, split-rendering may be used to render the XR environment to be presented to the user over the UE display. In split-rendering, a rendering server may be used to render the XR environment to be displayed in the UE display. More precisely, the rendering server may render the different XR views that are to be presented depending on the location, position, and/or orientation of the UE with respect to the XR environment. In these cases, a view of the XR environment may be rendered by the rendering server, and the rendered data may be transmitted, e.g., via a base station over a downlink (DL), to the UE.

In split-rendering implementations, the UE may transmit pose information to the base station, which may in turn transmit this info to the rendering server. It is noted that, as mentioned above, pose information may include any one of location, position, and/or orientation information, or any combination therefrom. As used herein, location, position, and/or orientation information may refer to any one of location, position, and/or orientation information, or any combination therefrom. In some implementations, the pose information may be transmitted to the base station periodically (e.g., at a certain frequency, such as 500 Hz). Similarly, the rendering server may transmit downlink rendered data to the UE (e.g., via the base station) over a downlink at a given frame rate.

Figure 3:
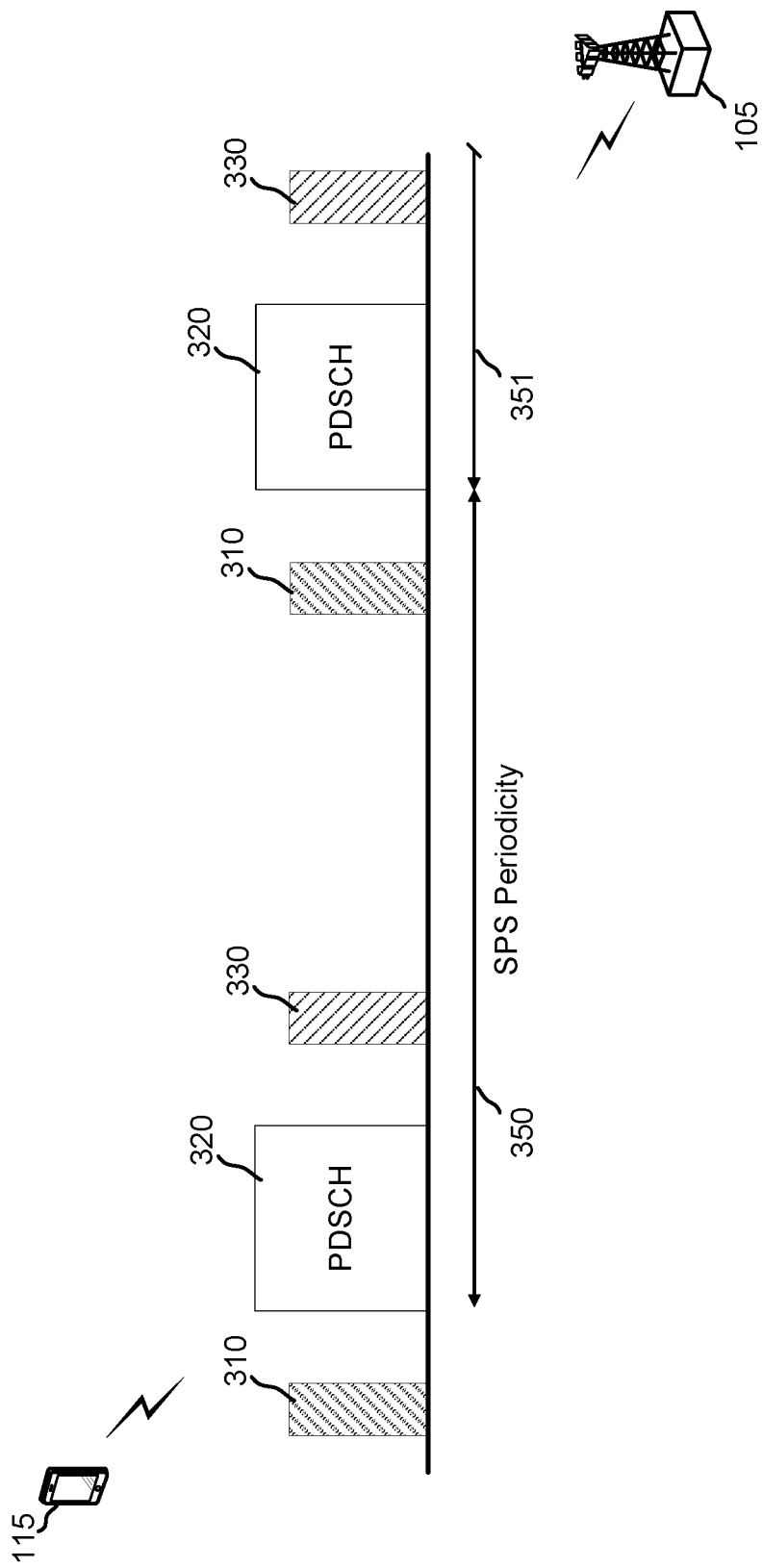
FIG. 3 is a block diagram showing an example SPS configuration.

In implementations, semi-persistent scheduling (SPS) may be used. In SPS, the base station may configure resources for SPS occasions during which transmissions may be transmitted to and from the UE. The SPS configuration may be provided to the UE, and the UE may receive and transmit transmissions from and to the base station during the SPS occasions. For example, during an SPS occasion, the UE may be configured to receive a PDSCH transmission over downlink resources configured for the SPS occasion, and may be configured to transmit PUCCH transmissions (e.g., including pose information and/or hybrid repeat request (HARQ) feedback) to the base station over uplink resources configured for the SPS occasion. FIG. 3 is a block diagram showing an example SPS configuration. As shown in the example illustrated in FIG. 3, UE 115 UE may be configured with SPS occasions of a given periodicity, and each SPS occasion may be configured with downlink and uplink resources. In this example, for each SPS occasion, UE 115 may be configured to transmit pose information to base station 105 in a PUCCH transmission on uplink resources of the SPS occasion, to receive rendered data from base station 105 in a PDSCH transmission on downlink resources of the SPS occasion, and to transmit HARQ feedback to base station 105 in a PUCCH transmission on uplink resources of the SPS occasion. For example, during SPS occasion 350, UE 115 may transmit pose information to base station 105 in PUCCH transmission 310. Base station 105 may then transmit rendered data on PDSCH transmission 320 to UE 115. UE 115 may then transmit HARQ feedback on PUCCH transmission 330 to base station 105. These transmissions may continue in accordance with the frequency of the uplink pose transmissions, the downlink rendered data transmissions, and the periodicity of the SPS occasions.

However, in some implementations, instead of transmitting the pose information to the base station periodically, the UE may suppress transmission of the pose information to reduce the uplink traffic to the base station. For example, in some cases, the rendered data (e.g., the data representing the rendered XR views) transmissions from the base station to the UE may be significantly dependent on the pose information (e.g., the uplink pose transmission and the rendered downlink transmission may be aligned). This may be the case wherein the XR environment may be related to a sight-seeing XR app. In this case, the content of the field of view may be somewhat static, and may change almost entirely based on the UE's movement, and not based on other users' movements. For example, where a view of a mountain is presented, the content of the field of view presented to the user may depend on the orientation of the UE (e.g., where the UE is "looking"), and not on other movements of the user. In these implementations, the UE may be configured to transmit pose information to the base station over the uplink when the UE experiences either a rotational or translational movement, rather than based on a predefined frequency. In this manner, the UE may obtain performance improvements by reducing uplink traffic.

Further optimizations are obtained in some implementations in which the rendered data downlink transmission from the rendering server (e.g., via the base station) are dependent on receiving pose information from the UE over the uplink, rather than based on a given frame rate. In these implementations, the base station may not transmit rendered data to the UE over the downlink unless pose information has been transmitted from the UE to the base station over the uplink. In this manner, the uplink transmissions and the downlink receptions of the UE may be time aligned.

However, in these implementations in which the pose information and/or the rendered data may not be transmitted, downlink and uplink SPS resources configured to the UE may not be used and may therefore be wasted.

Various aspects of the present disclosure are directed to systems and methods that support mechanisms for SPS and HARQ feedback skipping for UE-initiated transmissions. In aspects, a UE may be configured for XR operations and may be configured with an SPS configuration including a plurality of SPS occasions, each SPS occasion configured with at least one downlink resource and at least one uplink resource. The UE may be configured to collect pose information related to at least one SPS occasion that includes orientation, location, and/or position information associated with the UE at the least one SPS occasion. For example, in some aspects, the UE may obtain pose information related to the at least one SPS occasion during the at least one SPS occasion. In some other aspects, the UE may collect or obtain predictive pose information that predicts possible pose information for the at least one SPS occasion. In these cases, the UE may predict, at the time prior to the at least one SPS occasion, what the possible orientation, location, and/or position of the UE may be during the at least one SPS occasion. In this manner, the UE may determine pose information related to the at least one SPS occasion prior to the occurrence of the at least one SPS occasion.

In aspects, the UE may analyze the pose information related to the at least one SPS occasion and/or may determine, based on the pose information, to skip at least one SPS occasion of the plurality of SPS occasions. The at least one SPS occasion to be skipped may be one or more subsequent and/or next SPS occasions whose uplink and/or downlink resources the UE may determine will not be used for XR transmissions. For example, the UE may determine, at a current SPS occasion, based on an analysis of the pose information, that the pose information related to the at least one SPS occasion does not present a situation in which the pose information should be transmitted to the base station during the at least one SPS occasion to obtain further rendered data (e.g., a further XR view). This may be the case, for example, where the UE's pose information related to the at least one SPS occasion does not predict that the UE is to experience a rotational or translational movement by the time of the at least one SPS occasion sufficient to require a new XR view to maintain the user's XR experience. In this case, the UE may determine to skip the at least one SPS occasion.

In aspects, skipping the at least one SPS occasion may include foregoing to transmit the pose information to the base station on the at least one SPS occasion occurring subsequent to the current SPS occasion, receiving rendered information from the base station UE in a PDSCH transmission in the at least one SPS occasion, and/or transmitting a HARQ feedback associated with a PDSCH transmission to the base station in the at least one SPS occasion. In aspects, the UE may transmit an indication to the base station of the determination by the UE to skip the at least one SPS occasion. For example, the UE may transmit the indication in a preconfigured uplink resource or may piggyback the indication in a PUCCH transmission prior to the SPS occasion. In aspects, the base station may receive the indication and, based on receiving the indication, may forego transmitting rendered data to the UE in a PDSCH during the SPS occasion, may forego receiving HARQ feedback for a PDSCH transmission in the SPS occasion, and/or may reallocate the resources configured for the SPS occasion to another UE, or for operations other than XR operations with the UE.

It is noted that, as used herein, SPS and HARQ feedback skipping may refer to procedures by the UE to forego using one or more SPS occasion for transmitting and/or receiving data to/from the base station during the SPS occasion or using the HARQ feedback resources, and/or procedures by the base station to forego using one or more SPS occasion for receiving and/or transmitting data from/to the UE. It is also noted that, as used herein, the terms "foregoing" and "forego" may refer to the act of omitting, declining, going without, or otherwise not taking some action. For example, foregoing to transmit pose information to the base station on at least one SPS occasion may refer to omitting, declining, going without, or otherwise not transmitting pose information to the base station on at least one SPS occasion.

Figure 4:
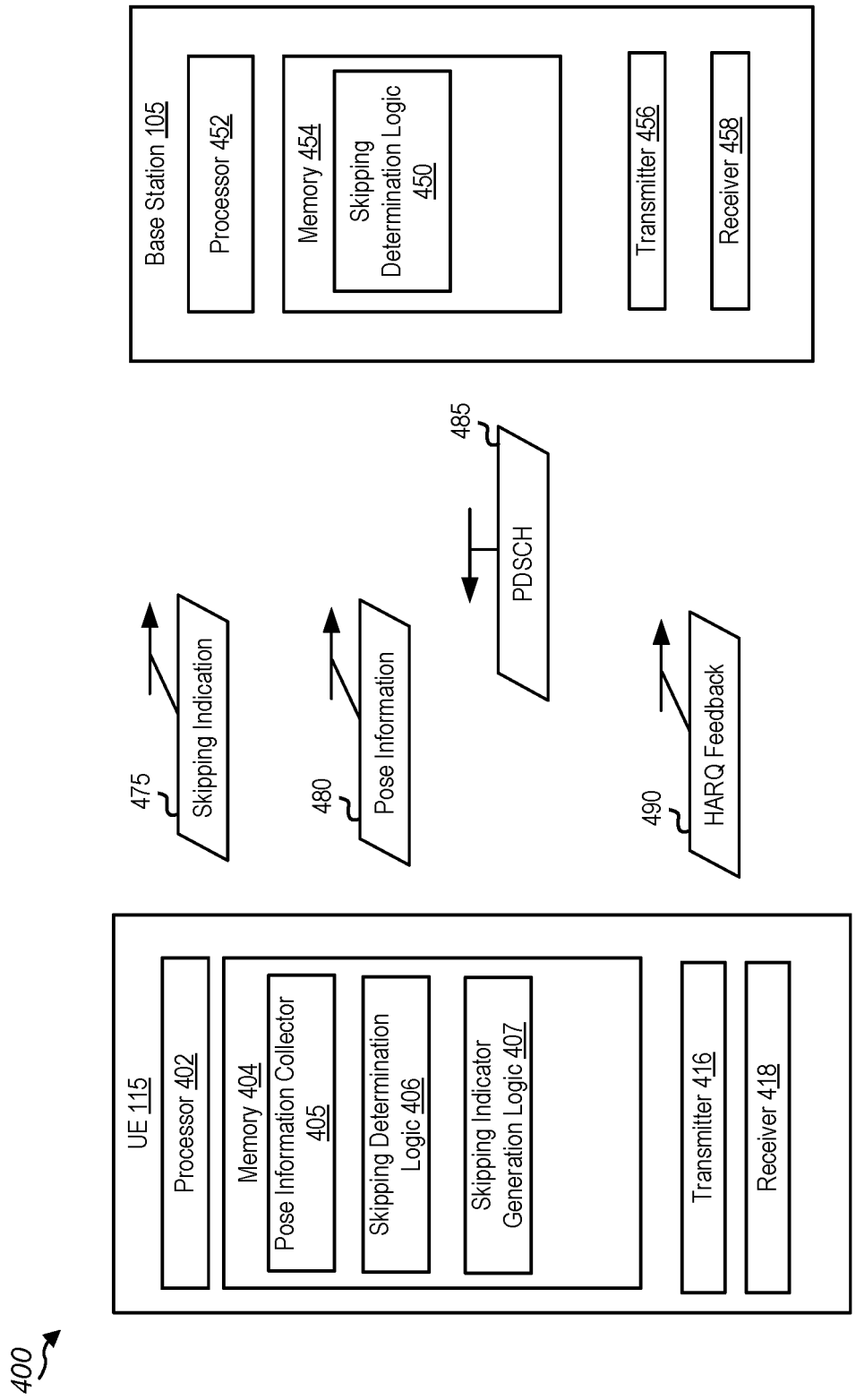
FIG. 4 is a block diagram of an example wireless communications system that supports semi-persistent scheduling (SPS) and hybrid automatic repeat request (HARQ) feedback skipping for UE-initiated transmissions in a wireless communication system according to one or more aspects of the present disclosure

FIG. 4 is a block diagram of an example wireless communications system 400 that supports mechanisms for SPS and HARQ feedback skipping for UE-initiated transmissions in a wireless communication system according to one or more aspects of the present disclosure. In some examples, wireless communications system 400 may implement aspects of wireless network 100. Wireless communications system 400 includes UE 115 and base station 105. Although one UE 115 and one base station 105 are illustrated, in some other implementations, wireless communications system 400 may generally include multiple UEs 115, and may include more than one base station 105.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). Processor 402 may be configured to execute instructions stored in memory 404 to perform the operations described herein. In some implementations, processor 402 includes or corresponds to one or more receive processor 258, transmit processor 264, and controller 280, and memory 404 includes or corresponds to memory 282.

Memory 404 includes or is configured to store pose information collector 405, skipping determination logic 40, and skipping indicator generation logic 407. In aspects, pose information collector 405 is configured to perform operations for collecting pose information associated with UE 115. The pose information may include orientation, location, and/or position information associated with the UE. In aspects, sensors in UE 115 may be used to collect the pose information. In some aspects, pose information collector 405 may be configured to collect pose information continuously, regardless of whether there is a change in the pose information associated with UE 115. In some aspects, pose information collector 405 may be configured to collect pose information in response to a change in the pose information associated with UE 115. For example, pose information collector 405 may not collect pose information when the pose information associated with UE 115 has not changed (e.g., when UE 115 has not changed in orientation, location, and/or position), but may collect pose information when the pose information associated with UE 115 is determined and/or indicated to change (e.g., when UE 115 has changed in orientation, location, and/or position), as reported by pose information sensor(s).

In aspects, skipping determination logic 406 is configured to perform operations to determine whether to skip at least one SPS occasion. In aspects, skipping determination logic 406 may determine whether to skip at least one SPS occasion based on the collected pose information associated with UE 115. For example, in some aspects, the UE may obtain pose information related to the at least one SPS occasion during the at least one SPS occasion. In some other aspects, pose information related to the at least one SPS occasion may be obtained prior to the occurrence of the at least one SPS occasion. In these cases, at a time prior to the at least one SPS occasion, predictive pose information may be obtained that predicts possible pose information for the at least one SPS occasion. In these cases, skipping determination logic 406 may predict, at the time prior to the at least one SPS occasion, what the possible orientation, location, and/or position of UE 115 may be during the at least one SPS occasion. In some aspects, this predictive pose information may be predicted between 25 ms to 100 ms before the actual pose information is measured. In this manner, skipping determination logic 406 may determine pose information related to the at least one SPS occasion prior to the occurrence of the at least one SPS occasion.

In some aspects, when the pose information associated with UE 115 related to the at least one SPS occasion indicates that the orientation, location, and/or position of UE 115 at the least one SPS occasion has not changed, or has not changed significantly (e.g., has not changed by a value above a threshold) from the previous pose information, skipping determination logic 406 may determine that the pose information is not to be reported during the at least one SPS occasion to base station 105 (which when receiving pose information may relay the pose information to a rendering server for rendering an XR view based on the pose information). In this case, skipping determination logic 406 may determine to forego using the resources of the at least one SPS occasion for transmission and/or reception of XR related data to/from base station 105. For example, skipping determination logic 406 may determine to forego transmitting the pose information to base station 105 during the at least one SPS occasion, to forego receiving a PDSCH transmission including rendered data (e.g., data associated with a rendered XR view based on pose information) during the at least one SPS occasion, and/or to forego transmitting a HARQ feedback associated with a PDSCH transmission that includes rendered data during the at least one SPS occasion.

In some aspects, when the pose information associated with UE 115 related to the at the least one SPS occasion indicates that the orientation, location, and/or position of UE 115 at the least one SPS occasion has changed, or has changed significantly (e.g., has changed by a value above a threshold) from the previous pose information, skipping determination logic 406 may determine that the pose information is to be reported during the at least one SPS occasion to base station 105 (which when receiving pose information may relay the pose information to a rendering server for rendering an XR view based on the pose information). In this case, skipping determination logic 406 may determine to use the resources of the at least one SPS occasion for transmission and/or reception of XR related data to/from base station 105. For example, skipping determination logic 406 may determine to transmit the pose information in a PUCCH message carrying pose information 480 to base station 105 during the at least one SPS occasion, to receive PDSCH transmission 485 including rendered data (e.g., data associated with a rendered XR view based on pose information) during the at least one SPS occasion, and/or to transmit HARQ feedback 490 associated with PDSCH transmission 485 that includes the rendered data during the at least one SPS occasion.

In aspects, skipping indicator generation logic 406 is configured to perform operations to generate skipping indication 475 indicating that a determination by UE 115 to skip at least one SPS occasion. For example, in response to UE 115 determining to skip the at least one SPS occasion, skipping indicator generation logic 406 may generate skipping indication 475 to be sent to base station 105. Skipping indication 475 may be an indication to be included in a preconfigured uplink resource (e.g., a PUCCH resource scheduled for transmission prior to the at least one SPS occasion to be skipped) configured for transmitting skipping indication 475, may be an indication to be piggybacked in a PUCCH transmission (e.g., a PUCCH transmission carrying a HARQ feedback message, or a PUCCH transmission carrying non-pose information data) transmitted to base station 105 prior to the at least one SPS occasion to be skipped, and/or may be an indication to be piggybacked in a PUSCH transmission transmitted to base station 105 prior to the at least one SPS occasion to be skipped. In aspects, skipping indication 475 may be a one-bit indication indicating that the at least one SPS occasion to be skipped is the next SPS occasion (with respect to the SPS occasion during which skipping indication 475 is transmitted), or may be an N-bits indication indicating that the at least one SPS occasion to be skipped includes up to the next $2^N$ SPS occasions (with respect to the SPS occasion during which skipping indication 475 is transmitted).

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). Processor 452 may be configured to execute instructions stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store skipping determination logic 450. In aspects, skipping determination logic 450 is configured to perform operations to determine that a skipping indication (e.g., skipping indication 475) has been received by base station 105. In aspects, skipping determination logic 405 may be configured to cause base station 105 to perform operations in response to a determination that a skipping indication (e.g., skipping indication 475) has been received from UE 115. For example, in aspects, skipping determination logic 405 may determine that skipping indication 475 indicates that UE 115 intends to skip at least one SPS occasion. In aspects, the indication may also indicate whether the at least one SPS occasion is the next SPS occasion (e.g., with respect to the current SPS occasion during which skipping indication 475 is transmitted by UE 115), or includes up to the next $2^N$ SPS occasions (e.g., with respect to the current SPS occasion during which skipping indication 475 is transmitted by UE 115) based on the number of bits in skipping indication 475, as described above with respect to skipping indicator generation logic 407 of UE 115. In aspects, base station 105 may forego receiving pose information from UE 115 during the at least one SPS occasion, to forego transmitting a PDSCH transmission including rendered data (e.g., data associated with a rendered XR view based on pose information) during the at least one SPS occasion, and/or to forego receiving a HARQ feedback associated with a PDSCH transmission that includes rendered data during the at least one SPS occasion. In aspect, base station 105 may determine to reallocate the resources of the at least one SPS occasion in response to a determination that skipping indication has been received from UE 115.

It is noted that, in aspects, a skipping indication (e.g., skipping indication 475) may not be received from UE 115. In these cases, operations of base station 105 may be in accordance with existing protocols, and base station 105 may determine that UE intends to use the resource of the at least one SPS occasion for transmission and/or reception of XR related data to/from base station 105. In these cases, base station 105 may receive pose information in a PUCCH message carrying pose information 480 from UE 115 during the at least one SPS occasion, may transmit PDSCH transmission 485 including rendered data (e.g., data associated with a rendered XR view based on pose information 480) during the at least one SPS occasion, and/or to may receive HARQ feedback 490 associated with PDSCH transmission 485 that includes the rendered data during the at least one SPS occasion from UE 115.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP.

During operation of wireless communications system 400, base station 105 may configure UE 115 with SPS. In aspects, base station 105 may configure UE 115 with SPS grants that include downlink and uplink resources for each of a plurality of SPS occasions. UE 115 may transmit and/or receive data to/from base station 105 over the resources of each of the plurality of SPS occasions. For example, in one particular example, UE 115 may transmit, during an SPS occasion, pose information 480 to base station 105 using uplink resources (e.g., a PUCCH resource) configured for the SPS occasion. In aspects, base station 105 may relay pose information 480 to a rendering server (not shown), and may receive, from the rendering server, rendered data representing an XR view of an XR environment rendered based on the pose information. Base station 105 may transmit the rendered data to UE 115 using downlink resources (e.g., PDSCH transmission 485) configured for the SPS occasion. UE 115 may receive the rendered data transmission and may transmit HARQ feedback 490 for the rendered data transmission to base station 105 using uplink resources (e.g., a PUCCH resource) configured for the SPS occasion.

During operation of wireless communications system 400, UE 115 may determine whether to skip at least one SPS occasion. In aspects, UE 115 may determine whether to skip at least one SPS occasion based on pose information associated with UE 115 and related to the at least one SPS occasion. For example, UE 115 may collect or obtain pose information related to the at least one SPS occasion that may include orientation, location, and/or position information associated with UE 115 with respect to the at least one SPS occasion. In aspects, UE 115 may obtain pose information related to the SPS occasion by obtaining pose information associated with UE 115 during the at least one SPS occasion. In some other aspects, at a time prior to the at least one SPS occasion, UE 115 may obtain predictive pose information that predicts possible pose information related to the at least one SPS occasion. In these cases, UE 115 may predict, at the time prior to the at least one SPS occasion, what a possible orientation, location, and/or position of UE 115 may be during the at least one SPS occasion. In some aspects, this predictive pose information may be predicted between 25 ms to 100 ms before the actual pose information is measured. In this manner, UE 115 may determine pose information related to the at least one SPS occasion prior to the occurrence of the at least one SPS occasion.

In aspects, UE 115 may analyze the pose information related to the at least one SPS and may determine whether the pose information indicates that the orientation, location, and/or position of UE 115 at the time of the at least one SPS occasion has changed, or has changed significantly (e.g., has changed by a value above a threshold) from the previous pose information (e.g., from pose information related to an SPS occasion prior to the at least one SPS occasion). In aspects, based on a determination that the pose information indicates that the orientation, location, and/or position of UE 115 has changed, or has changed significantly (e.g., has changed by a value above a threshold) from the previous pose information, UE 115 may determine that the pose information is to be reported during the at least one SPS occasion to base station 105 (which when receiving pose information may relay the pose information to a rendering server (not shown) for rendering an XR view based on the pose information). In this case, UE 115 may determine to forego skipping the at least one SPS occasion, and may determine to use the resources of the at least one SPS occasion for transmission and/or reception of XR related data to/from base station 105. For example, UE 115 may determine to transmit the pose information in a PUCCH message carrying pose information 480 to base station 105 during the at least one SPS occasion, to receive PDSCH transmission 485 including rendered data (e.g., data associated with a rendered XR view based on pose information) during the at least one SPS occasion, and/or to transmit HARQ feedback 490 associated with PDSCH transmission 485 that includes the rendered data during the at least one SPS occasion. In this manner, UE 115 may forego skipping the at least one SPS occasion and may use the resources of the at least one SPS occasion for XR related transmissions to and from base station 105.

In aspects, based on a determination that the pose information indicates that the orientation, location, and/or position of UE 115 has not changed, or has not changed significantly (e.g., has not changed by a value above a threshold) from the previous pose information (e.g., from pose information related to an SPS occasion prior to the at least one SPS occasion), UE 115 may determine that the pose information is not to be reported during the at least one SPS occasion to base station 105. In this case, UE 115 may determine to skip the at least one SPS occasion. In aspects, skipping the at least one SPS occasion may include UE 115 determining to forego using the resources of the at least one SPS occasion for transmission and/or reception of XR related data to/from base station 105. For example, UE 115 may determine to forego transmitting the pose information (e.g., in a PUCCH message carrying pose information 480) to base station 105 during the at least one SPS occasion. As UE 115 may forego transmitting the pose information to base station 105, UE 115 may expect that base station 105 may forego transmitting a PDSCH transmission (e.g., PDSCH transmission 485) that includes rendered data (e.g., data associated with a rendered XR view based on pose information) during the at least one SPS occasion. As such, UE 115 may skip the at least one SPS by foregoing receiving a PDSCH transmission including rendered data during the at least one SPS occasion. As UE 115 may forego receiving a PDSCH transmission including rendered data during the at least one SPS occasion, UE 115 may further skip the at least one SPS occasion by foregoing to transmit a HARQ feedback associated with a PDSCH transmission that includes rendered data during the at least one SPS occasion.

Figure 5A:
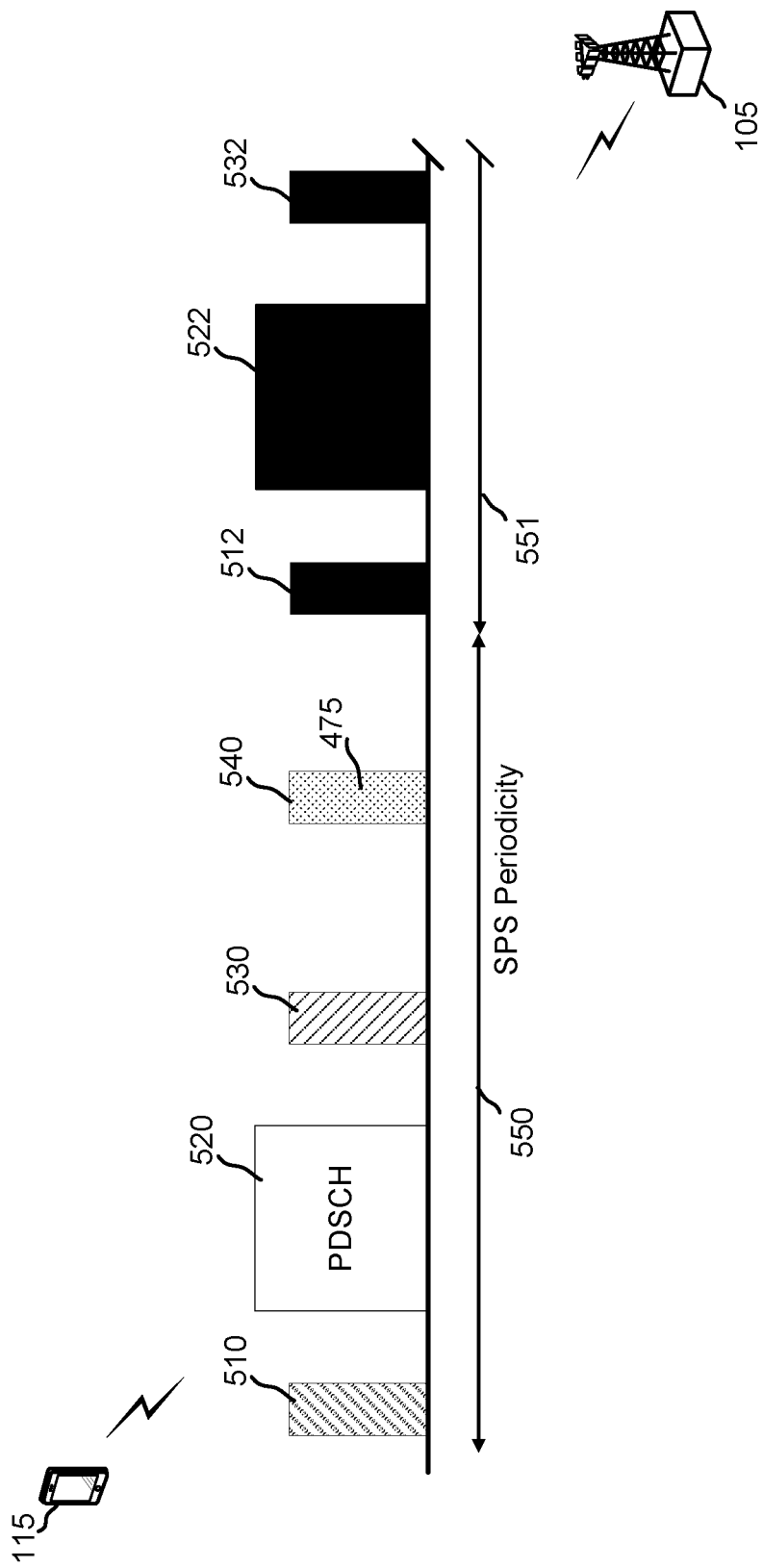
FIG. 5A is a block diagram illustrating a skipping indication configured for transmission in a preconfigured uplink resource in accordance with aspects of the present disclosure.

During operation of wireless communications system 400, UE 115 may configure a skipping indication (e.g., skipping indication 475) to be transmitted to base station 105 to indicate to base station 105 the determination by UE 115 to skip the at least one SPS occasion. In aspects, skipping indication 475 may serve to notify base station 105 that UE 115 intends to skip, or not use, the resources of the at least one SPS occasion to transmit/receive XR-related data to/from base station 105. For example, in some aspects, UE 115 may configure skipping indication 475 as an indication to be included in a preconfigured uplink resource specifically configured for transmitting skipping indication 475. FIG. 5A is a block diagram illustrating a skipping indication configured for transmission in a preconfigured uplink resource in accordance with aspects of the present disclosure. As shown in FIG. 5A, UE 115 may determine to transmit a skipping indication to base station 105 to skip SPS occasion 551. In this example, UE 115 may transmit pose information to base station 105 in PUCCH resource 510 of SPS 550, may receive rendered data from base station 105 in PDSCH resource 520 of SPS 550, and/or may transmit HARQ feedback in PUCCH resource 530 of SPS 550. In this example, the determination to skip SPS occasion 551 may be made prior to SPS occasion 551. The skipping indication may notify base station 105 that UE 115 intends to skip SPS occasion 551 and not use the resources of SPS occasion 551 for XR-related transmissions/receptions. As shown, UE 115 is configured with preconfigured uplink resource 540, which may include a PUCCH transmission transmitted to base station 105. In aspects, preconfigured uplink resource 540 may be configured to carry skipping indication 475 to base station 105. In aspects, the configuration of preconfigured uplink resource 540 may include a field for including skipping indication 475. As shown, uplink resources 512 and 532, and/or downlink resource 522 of SPS occasion 551 may be skipped, and may not be used for XR related transmissions between UE 115 and base station 105.

Figure 5B:
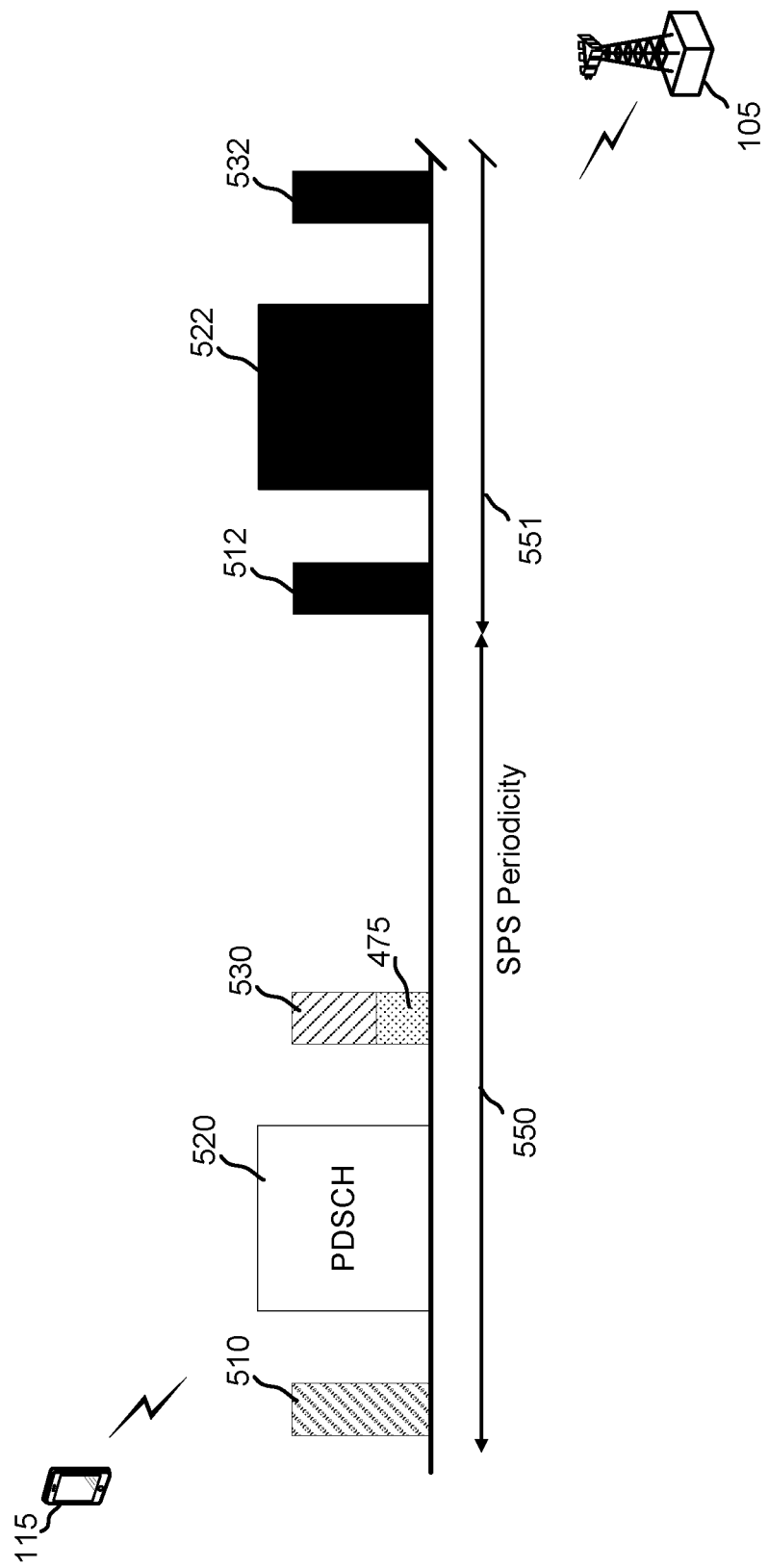
FIG. 5B is a block diagrams illustrating an example of a skipping indication configured for transmission in another uplink transmission in accordance with aspects of the present disclosure.
Figure 5C:
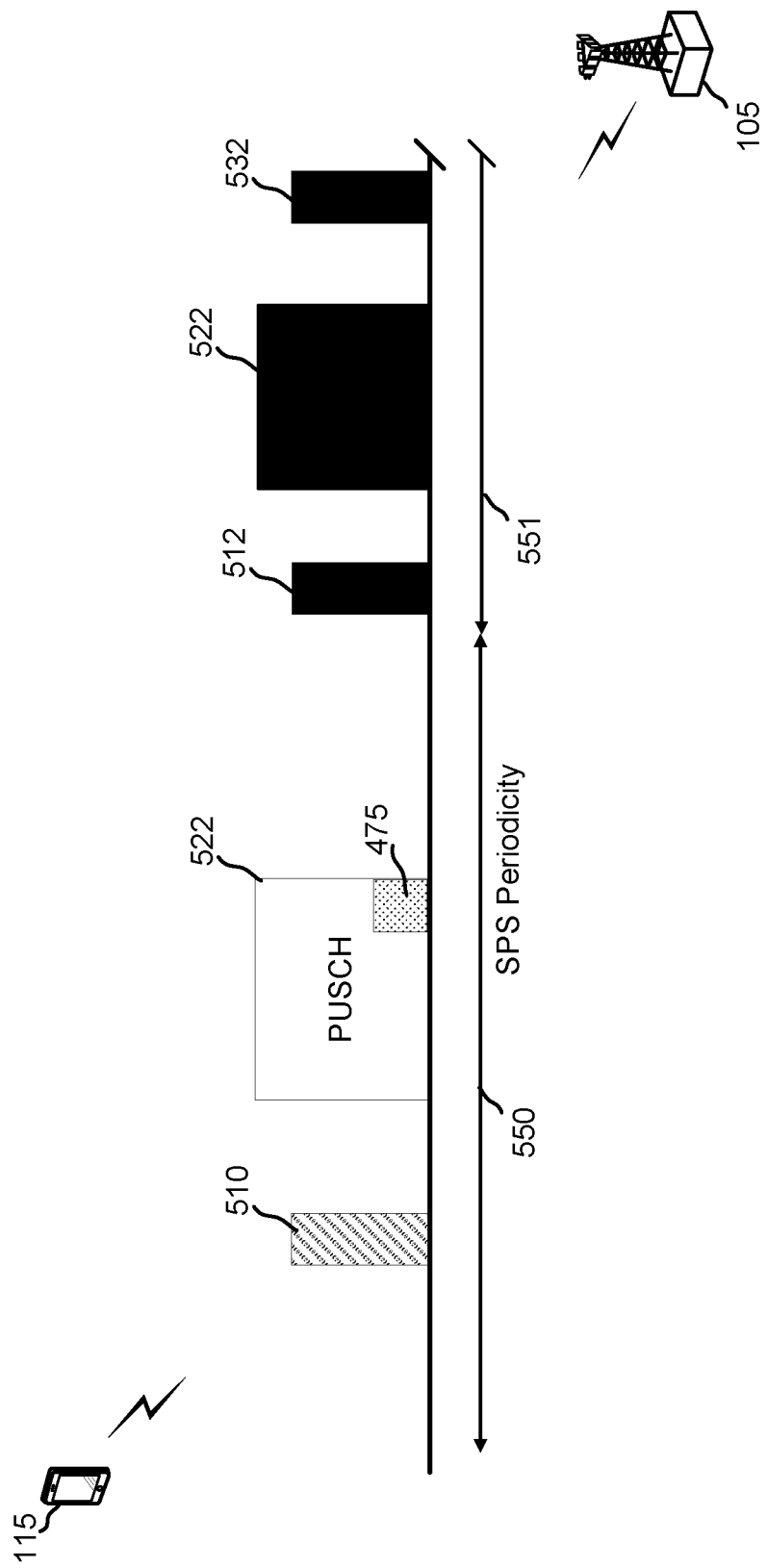
FIG. 5C is a block diagrams illustrating another example of a skipping indication configured for transmission in another uplink transmission in accordance with aspects of the present disclosure.

In some aspects, UE 115 may configure skipping indication 475 as an indication to be to be piggybacked in another uplink transmission. FIGS. 5B and 5C are block diagrams illustrating a skipping indication configured for transmission in another uplink transmission in accordance with aspects of the present disclosure. As shown in FIG. 5B, UE 115 may determine to transmit a skipping indication to base station 105 to skip SPS occasion 551. In this example, UE 115 may transmit pose information to base station 105 in PUCCH resource 510 of SPS 550, may receive rendered data from base station 105 in PDSCH resource 520 of SPS 550, and/or may transmit HARQ feedback in PUCCH resource 530 of SPS 550. In this example, the determination to skip SPS occasion 551 may be made prior to SPS occasion 551. The skipping indication may notify base station 105 that UE 115 intends to skip SPS occasion 551 and not use the resources of SPS occasion 551 for XR-related transmissions/receptions. As shown, UE 115 may be configured to include skipping indication 475 in HARQ feedback transmission 530, which may be transmitted in a PUCCH transmission to base station 105. In this manner, UE 115 may piggyback the transmission of skipping indication 475 onto HARQ feedback transmission 530. As shown, uplink resources 512 and 532, and/or downlink resource 522 of SPS occasion 551 may be skipped, and may not be used for XR related transmissions between UE 115 and base station 105.

FIG. 5C shows another example of piggybacking the skipping indication onto another uplink transmission. As shown in FIG. 5C, UE 115 may determine to transmit a skipping indication to base station 105 to skip SPS occasion 551. In this particular example, UE 115 may not have pose information to transmit to base station 105 in PUCCH resource 510 of SPS 550. Instead, UE 115 may have non-pose information to be transmitted to base station 105. As such, UE 115 may transmit a PUCCH transmission 510 and then may transmit PUSCH transmission 522 to base station 105. In this example, UE 115 may be configured to include skipping indication 475 in PUSCH transmission 522. In this manner, UE 115 may piggyback the transmission of skipping indication 475 onto a PUSCH transmission to base station 105. As shown, uplink resources 512 and 532, and/or downlink resource 522 of SPS occasion 551 may be skipped, and may not be used for XR related transmissions between UE 115 and base station 105.

With reference back to FIG. 4, in aspects, skipping indication 475 may be configured as a one-bit indication indicating that the at least one SPS occasion to be skipped is the next SPS occasion. As used herein, the next SPS occasion may refer to the SPS occasion immediately following the SPS occasion in which the one-bit skipping indication is transmitted from UE 115 to base station 105. In these aspects, base station 105 may be notified, by the one-bit skipping indication, that UE 115 intends to skip (e.g., not use the resources of) the next SPS occasion.

In some aspects, skipping indication 475 may be configured as an N-bits indication indicating that the at least one SPS occasion to be skipped includes up to the next $2^N$ SPS occasions. In these aspects, base station 105 may be notified, by the N-bits skipping indication, that UE 115 intends to skip (e.g., not use the resources of) the next $2^N$ SPS occasions. As used herein, the next $2^N$ SPS occasions may refer to the $2^N$ SPS occasions immediately following the SPS occasion in which the N-bits skipping indication is transmitted from UE 115 to base station 105.

During operation of wireless communications system 400, base station 105 may receive skipping indication 475 indicating to base station 105 that UE 115 is to skip the at least one SPS occasion. Base station 105 may, in response to receiving skipping indication 475 indicating that UE 115 is to skip the at least one SPS occasion and forego using the resources of the at least one SPS occasion for transmitting and/or receiving XR-related transmission to and/or from base station 105, perform skipping operations. In aspects, the skipping operations may include determining to forego receiving pose information (e.g., in a PUCCH message carrying pose information 480) from UE 115 during the at least one SPS occasion, as the UE is to forego transmitting the pose information during the at least one SPS occasion. As base station 105 may forego receiving the pose information from UE 115, UE 115 may expect that base station 105 may forego transmitting a PDSCH transmission (e.g., PDSCH transmission 485) that includes rendered data (e.g., data associated with a rendered XR view based on pose information) during the at least one SPS occasion. As such, base station 105 may perform skipping operations by foregoing to transmit a PDSCH transmission including rendered data during the at least one SPS occasion to UE 115. As base station 105 may forego transmitting a PDSCH transmission including rendered data during the at least one SPS occasion, base station 105 may expect UE 115 to forego transmitting a HARQ feedback associated with a PDSCH transmission that includes rendered data during the at least one SPS occasion. As such, base station 105 may perform skipping operations by foregoing to receive a HARQ feedback associated with a PDSCH transmission that includes rendered data during the at least one SPS occasion from UE 115.

In some aspect, the skipping operations performed by base station 105 in response to receiving skipping indication 475 indicating that UE 115 is to skip the at least one SPS occasion and forego using the resources configured for the at least one SPS occasion for transmitting and/or receiving XR-related transmission to and/or from base station 105 may include reallocating the resources configured for the at least one SPS occasion. In aspects, reallocating the resources configured for the at least one SPS occasion may include reallocating the resources configured for the at least one SPS occasion to another UE, different from UE 115. In some aspects, reallocating the resources configured for the at least one SPS occasion may include reallocating the resources configured for the at least one SPS occasion for operations other than XR-related operations. By reallocating the resources configured for the at least one SPS occasion, base station may improve performance, as these resources configured for the at least one SPS occasion may be prevented from going unused and wasted, since UE 115 is to forego using these resources configured for the at least one SPS occasion. In some implementations, this may lead to substantial performance gains, as the opportunities for SPS and HARQ skipping may be large given the amount of SPS resources that are wasted when no pose information is transferred between UE and base station, but the SPS resources of the SPS occasions remain assigned to the UE.

Figure 6:
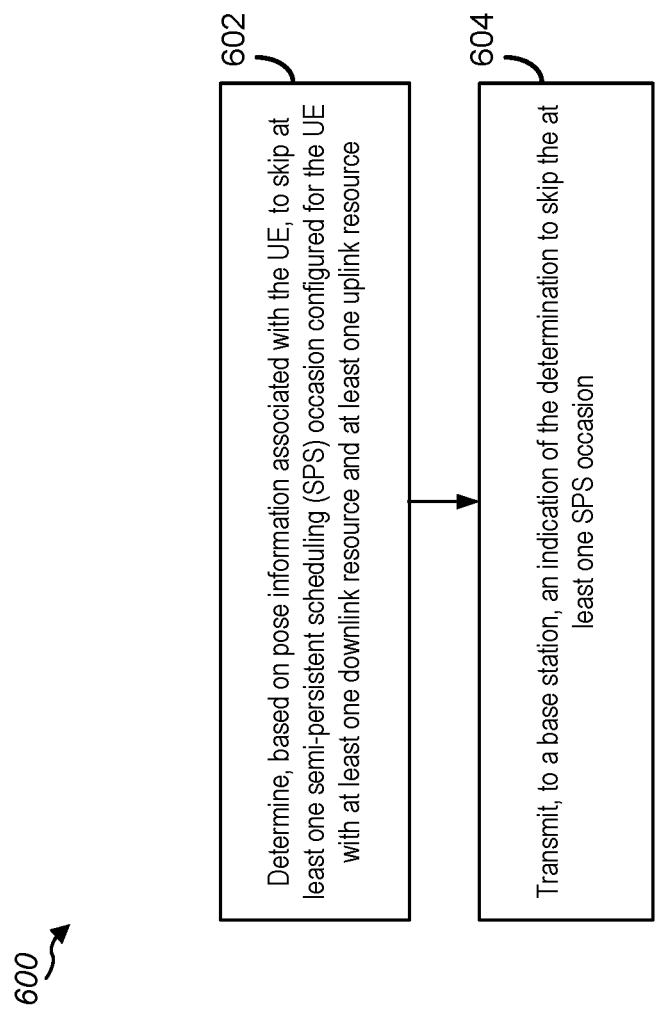
FIG. 6 is a flow diagram illustrating an example process that supports SPS and HARQ feedback skipping for UE-initiated transmissions in a wireless communication system according to one or more aspects.
Figure 8:
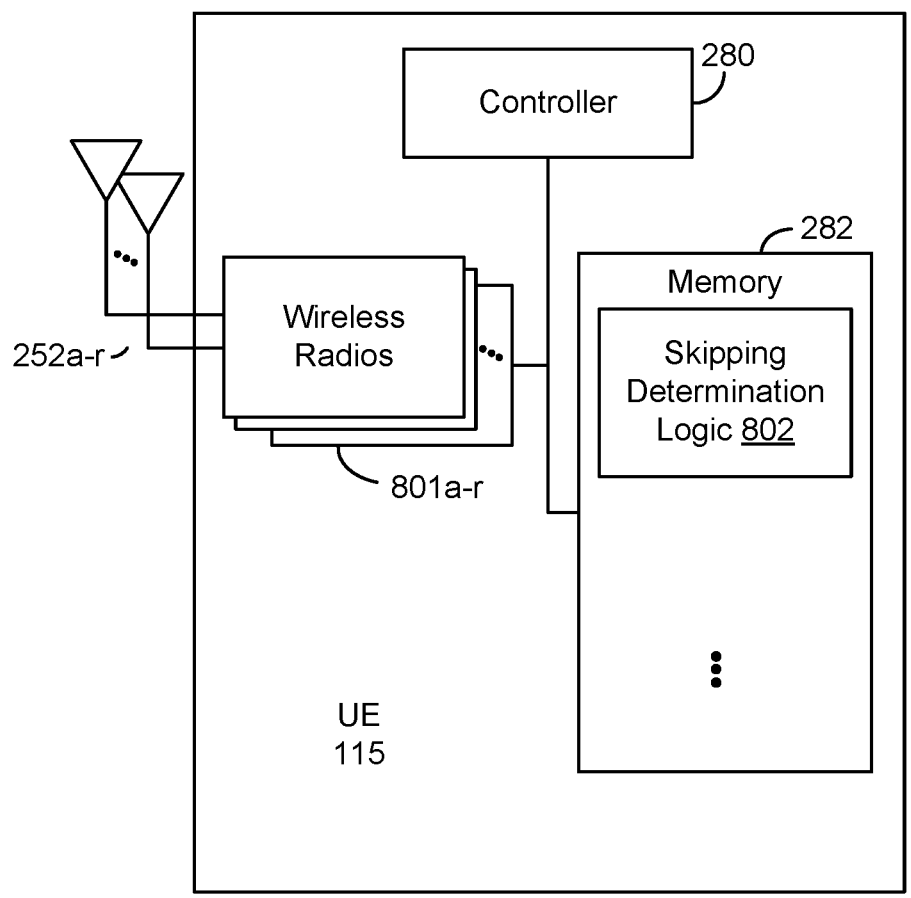
FIG. 8 is a block diagram of an example UE that supports SPS and HARQ feedback skipping for UE-initiated transmissions in a wireless communication system according to one or more aspects.

FIG. 6 is a flow diagram illustrating an example process 600 that supports mechanisms for SPS and HARQ feedback skipping for UE-initiated transmissions in a wireless communication system according to one or more aspects of the present disclosure. Operations of process 600 may be performed by a UE, such as UE 115 described above with reference to FIGS. 1-5 and 8. For example, example operations (also referred to as "blocks") of process 600 may enable UE 115 to support mechanisms for determining a transmit power of a PEI transmission. FIG. 8 is a block diagram illustrating UE 115 configured according to aspects of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r includes various components and hardware, as illustrated in FIG. 2 for UE 115, including modulator/demodulators 254a-r, MIMO detector 256, receive processor 258, transmit processor 264, and TX MIMO processor 266.

At block 602 of process 600, a UE (e.g., UE 115) determines, based on pose information associated with the UE, to skip at least one SPS occasion configured for the UE with at least one downlink resource and at least one uplink resource. In order to implement the functionality for such operations, the UE, under control of controller/processor 280, executes skipping determination logic 802, stored in memory 282. The functionality implemented through the execution environment of skipping determination logic 802 allows for the UE to perform SPS occasion skipping determination operations according to the various aspects herein.

In aspects, the pose information associated with the UE includes one or more of location information, position information, or orientation information associated with the UE. In some aspects, the pose information associated with the UE may include predictive pose information indicating an expected pose information for a subsequent time. In these aspects, the UE may be configured to determine to skip the at least one SPS occasion by determining, based on the predictive pose information, to forego transmission of the predictive pose information to the base station at least a period of time prior to the subsequent time.

In aspects, skipping the at least one SPS occasion may include foregoing transmitting the pose information from the UE to the base station over the at least one uplink resource of the SPS occasion. In alternative or additional aspects, skipping the at least one SPS occasion may include foregoing receiving a rendered data transmission from the base station over the at least one downlink resource of the SPS occasion. In still other alternative or additional aspects, skipping the at least one SPS occasion may include foregoing transmitting HARQ feedback for a rendered data transmission to the base station over the at least one uplink resource of the SPS occasion.

At block 604 of process 600, the UE transmits, to a base station (e.g., base station 105), an indication of the determination to skip the at least one SPS occasion. In order to implement the functionality for such operations, UE 115, under control of controller/processor 280, may transmit and indication to base station 105 that a determination has been made to skip at least one SPS occasion via wireless radios 801a-r and antennas 252a-r.

In aspects, the UE may transmit the indication of the determination to skip the at least one SPS occasion in a preconfigured uplink resource configured for transmitting the indication of the determination to skip the at least one SPS occasion. The preconfigured uplink resource may belong to an SPS occasion occurring prior to the at least one SPS occasion. For example, the UE may transmit the indication as an indication to be included in a preconfigured uplink resource (e.g., a PUCCH resource scheduled for transmission prior to the at least one SPS occasion to be skipped) configured for transmitting the indication.

In aspects, the UE may transmit the indication of the determination to skip the at least one SPS occasion in an uplink transmission that includes HARQ feedback for a PDSCH transmission received during an SPS occasion occurring prior to the at least one SPS occasion. For example, the UE may piggyback the indication in a PUCCH transmission (e.g., a PUCCH transmission carrying a HARQ feedback message, or a PUCCH transmission carrying non-pose information data) transmitted to base station 105 prior to the at least one SPS occasion to be skipped, and/or may be an indication to be piggybacked in a PUSCH transmission transmitted to base station 105 prior to the at least one SPS occasion to be skipped.

In aspects, transmitting the indication of the determination to skip the at least one SPS occasion may include transmitting the indication of the determination to skip the at least one SPS occasion in an uplink transmission that includes data other than pose information. In aspects, the uplink transmission may be transmitted to the base station during an SPS occasion occurring prior to the at least one SPS occasion, and may include a PUCCH transmission and/or a PUSCH transmission.

In aspects, transmitting the indication of the determination to skip the at least one SPS occasion may include transmitting the indication of the determination to skip the at least one SPS occasion during an SPS occasion occurring prior to the at least one SPS occasion. In these cases, the indication of the determination to skip the at least one SPS occasion may include a one-bit indication that a next SPS occasion is to be skipped, and/or an N-bit indication that up to 2N next SPS occasions are to be skipped.

Figure 7:
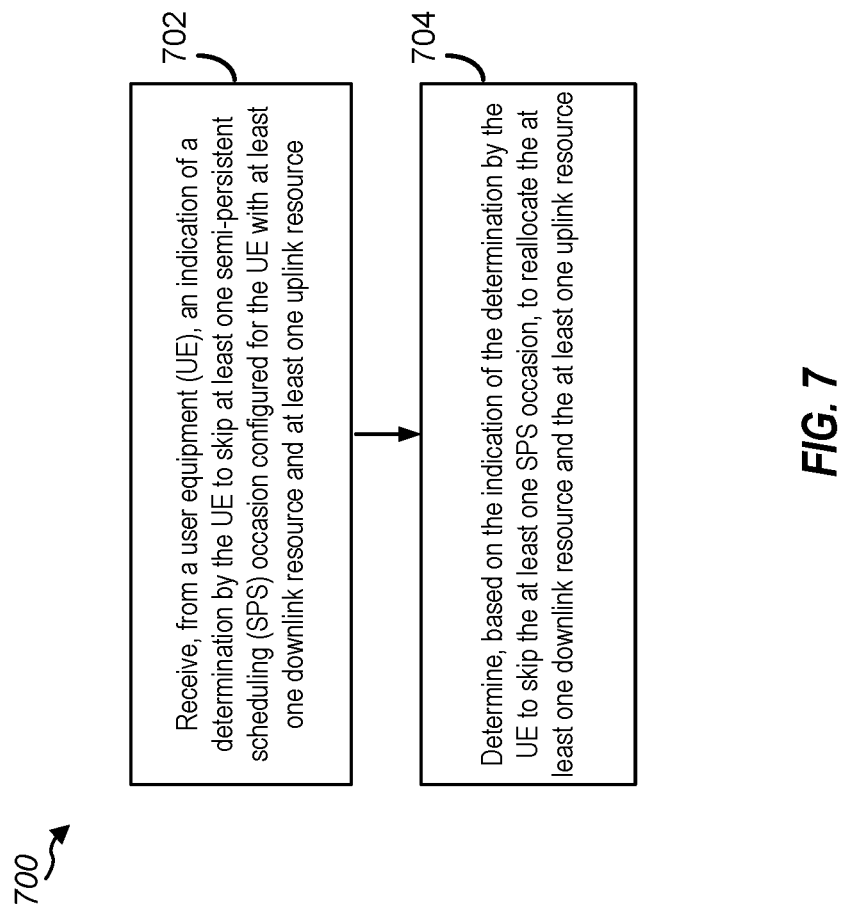
FIG. 7 is a flow diagram illustrating an example process that supports SPS and HARQ feedback skipping for UE-initiated transmissions in a wireless communication system according to one or more aspects.
Figure 9:
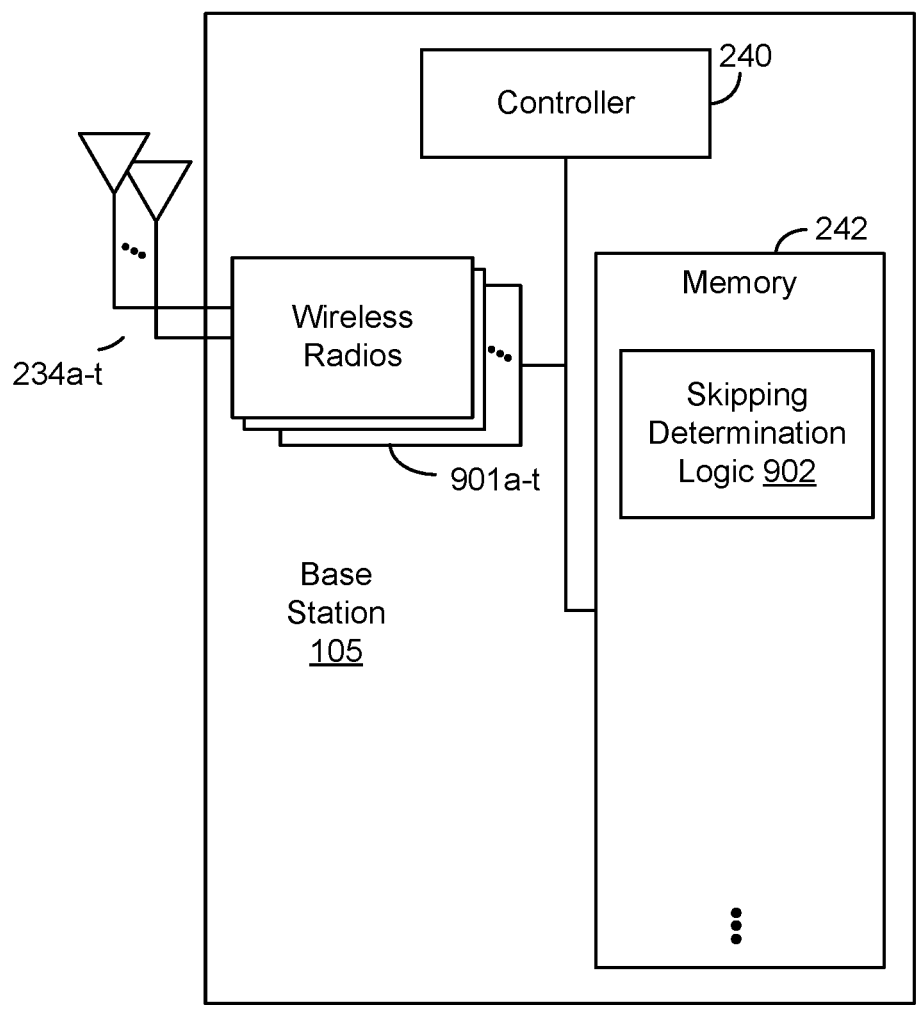
FIG. 9 is a block diagram of an example base station that supports SPS and HARQ feedback skipping for UE-initiated transmissions in a wireless communication system according to one or more aspects.

FIG. 7 is a block diagram illustrating an example an example process 700 that supports mechanisms for SPS and HARQ feedback skipping for UE-initiated transmissions in a wireless communication system according to one or more aspects. Operations of process 700 may be performed by a base station, such as base station 105 described above with reference to FIGS. 1-4 and 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 901a-t and antennas 234a-t. Wireless radios 901a-t includes various components and hardware, as illustrated in FIG. 2 for base station 105, including modulator/demodulators 232a-t, MIMO detector 236, receive processor 238, transmit processor 220, and TX MIMO processor 230.

At block 702 of process 700, a base station (e.g., base station 105) receives, from a UE (e.g., UE 115), an indication of a determination by the UE to skip at least one SPS occasion configured for the UE with at least one downlink resource and at least one uplink resource. In order to implement the functionality for such operations, the base station, under control of controller/processor 240, may receive the indication from UE 115 via wireless radios 901*a-r* and antennas 234*a-t*.

In aspects, receiving the indication of the determination to skip the at least one SPS occasion may include receiving the indication of the determination to skip the at least one SPS occasion in an uplink transmission that includes HARQ feedback for a PDSCH transmission transmitted to the UE during an SPS occasion occurring prior to the at least one SPS occasion.

In aspects, receiving the indication of the determination to skip the at least one SPS occasion includes receiving the indication of the determination to skip the at least one SPS occasion in an uplink transmission from the UE that includes data other than pose information. In these aspects, the uplink transmission may be transmitted by the UE to the base station during an SPS occasion occurring prior to the at least one SPS occasion, and may include a PUCCH transmission and/or a PUSCH transmission.

In aspects, receiving the indication of the determination to skip the at least one SPS occasion includes receiving the indication of the determination to skip the at least one SPS occasion during an SPS occasion occurring prior to the at least one SPS occasion. In aspects, the indication of the determination to skip the at least one SPS occasion may include a one-bit indication that a next SPS occasion is to be skipped, and/or an N-bit indication that up to 2N next SPS occasions are to be skipped.

In aspects, the base station may configure a preconfigured uplink resource of an SPS occasion occurring prior to the at least one SPS occasion for transmission of the indication of the determination by the UE to skip the at least one SPS occasion. In these aspects, the base station may receive the indication of the determination by the UE to skip the at least one SPS occasion from the UE over the preconfigured uplink resource.

At block 704 of process 700, the base station determines, based on the indication of the determination by the UE to skip the at least one SPS occasion, to reallocate the at least one downlink resource and the at least one uplink resource. In order to implement the functionality for such operations, base station 105, under control of controller/processor 240, executes skipping determination logic 902, stored in memory 242. The functionality implemented through the execution environment of skipping determination logic 902 allows for base station 105 to perform operations for reallocating the at least one downlink resource and the at least one uplink resource based on the indication of the determination by the UE to skip the at least one SPS occasion according to the various aspects herein.

In aspects, the base station may determine to forego receiving pose information from the UE over the at least one uplink resource of the SPS occasion based on the indication of the determination by the UE to skip the at least one SPS occasion. In alternative or additional aspects, the base station may determine to forego transmitting a rendered data transmission to the UE over the at least one downlink resource of the SPS occasion based on the indication of the determination by the UE to skip the at least one SPS occasion. In still other alternative or additional aspects, the base station may determine to forego receiving HARQ feedback for a rendered data transmission from the UE over the at least one uplink resource of the SPS occasion based on the indication of the determination by the UE to skip the at least one SPS occasion.

In aspects, the pose information associated with the UE includes one or more of location information, position information, or orientation information associated with the UE. In aspects, the pose information associated with the UE may include predictive pose information indicating an expected pose information for a subsequent time, and the UE may be configured to determine to skip the at least one SPS occasion by determining, based on the predictive pose information, to forego transmission of the predictive pose information to the base station at least a period of time prior to the subsequent time.

In one or more aspects, techniques for supporting mechanisms for SPS and HARQ feedback skipping for UE-initiated transmissions in a wireless communication system according to one or more aspects may include additional aspects, such as any single aspect or any combination of aspects described below or in connection with one or more other processes or devices described elsewhere herein. In a first aspect, supporting mechanisms for SPS and HARQ feedback skipping for UE-initiated transmissions in a wireless communication system may include an apparatus configured to determine, based on pose information associated with the UE, to skip at least one SPS occasion configured for the UE with at least one downlink resource and at least one uplink resource, and to transmit to a base station, an indication of the determination to skip the at least one SPS occasion. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, skipping the at least one SPS occasion includes foregoing transmitting the pose information to the base station over the at least one uplink resource of the SPS occasion.

In a third aspect, alone or in combination with the second aspect, skipping the at least one SPS occasion includes foregoing receiving a rendered data transmission from the base station over the at least one downlink resource of the SPS occasion.

In a fourth aspect, alone or in combination with one or more of the second aspect through the third aspect, skipping the at least one SPS occasion includes foregoing transmitting HARQ feedback for the rendered data transmission to the base station over the at least one uplink resource of the SPS occasion.

In a fifth aspect, alone or in combination with one or more of the first aspect through the fourth aspect, transmitting the indication of the determination to skip the at least one SPS occasion includes transmitting the indication of the determination to skip the at least one SPS occasion in a preconfigured uplink resource configured for transmitting the indication of the determination to skip the at least one SPS occasion, the preconfigured uplink resource belonging to an SPS occasion occurring prior to the at least one SPS occasion.

In a sixth aspect, alone or in combination with one or more of the first aspect through the fifth aspect, transmitting the indication of the determination to skip the at least one SPS occasion includes transmitting the indication of the determination to skip the at least one SPS occasion in an uplink transmission that includes HARQ feedback for a PDSCH transmission received during an SPS occasion occurring prior to the at least one SPS occasion.

In a seventh aspect, alone or in combination with one or more of the first aspect through the sixth aspect, transmitting the indication of the determination to skip the at least one SPS occasion includes transmitting the indication of the determination to skip the at least one SPS occasion in an uplink transmission that includes data other than pose information.

In an eighth aspect, alone or in combination with the seventh aspect, the uplink transmission is transmitted to the base station during an SPS occasion occurring prior to the at least one SPS occasion.

In a ninth aspect, alone or in combination with one or more of the seventh aspect through the eighth aspect, the uplink transmission includes a PUCCH transmission.

In a tenth aspect, alone or in combination with one or more of the seventh aspect through the ninth aspect, the uplink transmission includes a PUSCH transmission.

In an eleventh aspect, alone or in combination with one or more of the first aspect through the tenth aspect, the pose information associated with the UE include predictive pose information indicating an expected pose information for a subsequent time.

In a twelfth aspect, alone or in combination with the eleventh aspect, the UE is configured to determine to skip the at least one SPS occasion by determining, based on the predictive pose information, to forego transmission of the predictive pose information to the base station at least a period of time prior to the subsequent time.

In a thirteenth aspect, alone or in combination with one or more of the first aspect through the twelfth aspect, transmitting the indication of the determination to skip the at least one SPS occasion includes transmitting the indication of the determination to skip the at least one SPS occasion during an SPS occasion occurring prior to the at least one SPS occasion.

In a fourteenth aspect, alone or in combination with the thirteenth aspect, the indication of the determination to skip the at least one SPS occasion includes a one-bit indication that a next SPS occasion is to be skipped.

In a fifteenth aspect, alone or in combination with one or more of the thirteenth aspect through the fourteenth aspect, the indication of the determination to skip the at least one SPS occasion includes an N-bit indication that up to $2^N$ next SPS occasions are to be skipped.

In a sixteenth aspect, alone or in combination with one or more of the first aspect through the fifteenth aspect, the pose information associated with the UE includes one or more of location information, position information, or orientation information associated with the UE.

In a seventeenth aspect, supporting mechanisms for SPS and HARQ feedback skipping for UE-initiated transmissions in a wireless communication system may include an apparatus configured to receive, from a UE, an indication of a determination by the UE to skip at least one SPS occasion configured for the UE with at least one downlink resource and at least one uplink resource, and to determine, based on the indication of the determination by the UE to skip the at least one SPS occasion, to reallocate the at least one downlink resource and the at least one uplink resource. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In an eighteenth aspect, alone or in combination with the seventeenth aspect, the techniques of the seventeenth aspect include, based on the indication of the determination by the UE to skip the at least one SPS occasion, foregoing receiving pose information from the UE over the at least one uplink resource of the SPS occasion.

In a nineteenth aspect, alone or in combination with the eighteenth aspect, the techniques of the seventeenth aspect include, based on the indication of the determination by the UE to skip the at least one SPS occasion, foregoing transmitting a rendered data transmission to the UE over the at least one downlink resource of the SPS occasion.

In a twentieth aspect, alone or in combination with one or more of the eighteenth aspect through the nineteenth aspect, the techniques of the seventeenth aspect include, based on the indication of the determination by the UE to skip the at least one SPS occasion, foregoing receiving HARQ feedback for the rendered data transmission from the UE over the at least one uplink resource of the SPS occasion.

In a twenty-first aspect, alone or in combination with one or more of the seventeenth aspect through the twentieth aspect, the techniques of the seventeenth aspect include configuring a preconfigured uplink resource of an SPS occasion occurring prior to the at least one SPS occasion for transmission of the indication of the determination by the UE to skip the at least one SPS occasion.

In a twenty-second aspect, alone or in combination with the twenty-first aspect, the indication of the determination by the UE to skip the at least one SPS occasion is received over the preconfigured uplink resource.

In a twenty-third aspect, alone or in combination with one or more of the seventeenth aspect through the twenty-second aspect, receiving the indication of the determination to skip the at least one SPS occasion includes receiving the indication of the determination to skip the at least one SPS occasion in an uplink transmission that includes HARQ feedback for a PDSCH transmission transmitted to the UE during an SPS occasion occurring prior to the at least one SPS occasion.

In a twenty-fourth aspect, alone or in combination with one or more of the seventeenth aspect through the twenty-third aspect, receiving the indication of the determination to skip the at least one SPS occasion includes receiving the indication of the determination to skip the at least one SPS occasion in an uplink transmission from the UE that includes data other than pose information.

In a twenty-fifth aspect, alone or in combination with the twenty-fourth aspect, the uplink transmission is transmitted by the UE to the base station during an SPS occasion occurring prior to the at least one SPS occasion.

In a twenty-sixth aspect, alone or in combination with one or more of the twenty-fourth aspect through the twenty-fifth aspect, the uplink transmission includes a PUCCH transmission.

In a twenty-seventh aspect, alone or in combination with one or more of the twenty-fourth aspect through the twenty-sixth aspect, the uplink transmission includes a PUSCH transmission.

In a twenty-eighth aspect, alone or in combination with one or more of the seventeenth aspect through the twenty-seventh aspect, the pose information associated with the UE include predictive pose information indicating an expected pose information for a subsequent time.

In a twenty-ninth aspect, alone or in combination with the twenty-eighth aspect, the UE is configured to determine to skip the at least one SPS occasion by determining, based on the predictive pose information, to forego transmission of the predictive pose information to the base station at least a period of time prior to the subsequent time.

In a thirtieth aspect, alone or in combination with one or more of the seventeenth aspect through the twenty-ninth aspect, receiving the indication of the determination to skip the at least one SPS occasion includes receiving the indication of the determination to skip the at least one SPS occasion during an SPS occasion occurring prior to the at least one SPS occasion.

In a thirty-first aspect, alone or in combination with the thirtieth aspect, the indication of the determination to skip the at least one SPS occasion includes a one-bit indication that a next SPS occasion is to be skipped.

In a thirty-second aspect, alone or in combination with one or more of the thirtieth aspect through the thirty-first aspect, the indication of the determination to skip the at least one SPS occasion includes an N-bit indication that up to $2^N$ next SPS occasions are to be skipped.

In a thirty-third aspect, alone or in combination with one or more of the seventeenth aspect through the thirty-second aspect, the pose information associated with the UE includes one or more of location information, position information, or orientation information associated with the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   determining, based on pose information associated with the UE, to skip at least one semi-persistent scheduling (SPS) occasion configured for the UE with at least one downlink resource and at least one uplink resource; and
   transmitting, to a base station, an indication of the determination to skip the at least one SPS occasion.

2. The method of claim 1, wherein skipping the at least one SPS occasion includes one or more of:
   foregoing transmitting the pose information to the base station over the at least one uplink resource of the at least one SPS occasion;
   foregoing receiving a rendered data transmission from the base station over the at least one downlink resource of the at least one SPS occasion; or foregoing transmitting hybrid automatic repeat request (HARQ) feedback for the rendered data transmission to the base station over the at least one uplink resource of the at least one SPS occasion.

3. The method of claim 1, wherein transmitting the indication of the determination to skip the at least one SPS occasion includes transmitting the indication of the determination to skip the at least one SPS occasion in a preconfigured uplink resource configured for transmitting the indication of the determination to skip the at least one SPS occasion, the preconfigured uplink resource belonging to an SPS occasion occurring prior to the at least one SPS occasion.

4. The method of claim 1, wherein transmitting the indication of the determination to skip the at least one SPS occasion includes transmitting the indication of the determination to skip the at least one SPS occasion in an uplink transmission that includes hybrid automatic repeat request (HARQ) feedback for a physical downlink shared channel (PDSCH) transmission received during an SPS occasion occurring prior to the at least one SPS occasion.

5. The method of claim 1, wherein transmitting the indication of the determination to skip the at least one SPS occasion includes transmitting the indication of the determination to skip the at least one SPS occasion in an uplink transmission that includes data other than pose information, wherein the uplink transmission is transmitted to the base station during an SPS occasion occurring prior to the at least one SPS occasion, wherein the uplink transmission includes one or more of:
   a physical uplink control channel (PUCCH) transmission; or
   a physical uplink shared channel (PUSCH) transmission.

6. The method of claim 1, wherein the pose information associated with the UE includes predictive pose information indicating expected pose information for a subsequent time.

7. The method of claim 6, wherein determining, based on the pose information associated with the UE, to skip the at least one SPS occasion includes determining, based on the predictive pose information, to forego transmission of the predictive pose information to the base station at least a period of time prior to the subsequent time.

8. The method of claim 1, wherein transmitting the indication of the determination to skip the at least one SPS occasion includes transmitting the indication of the determination to skip the at least one SPS occasion during an SPS occasion occurring prior to the at least one SPS occasion, and wherein the indication of the determination to skip the at least one SPS occasion includes one or more of:
   a one-bit indication that a next SPS occasion is to be skipped; or
   an N-bit indication that up to $2^N$ next SPS occasions are to be skipped.

9. The method of claim 1, wherein the pose information associated with the UE includes one or more of location information, position information, or orientation information associated with the UE.

10. A method of wireless communication performed by a base station, the method comprising:
   receiving, from a user equipment (UE) during a semi-persistent scheduling (SPS) occasion prior to at least one SPS occasion, an indication of a determination by the UE to skip the at least one SPS occasion configured for the UE with at least one downlink resource and at least one uplink resource; and
   reallocating, based on the indication of the determination by the UE to skip the at least one SPS occasion, one or more of the at least one downlink resource or the at least one uplink resource, wherein the indication of the determination to skip the at least one SPS occasion includes one or more of:
   a one-bit indication that a next SPS occasion is to be skipped; or
   an N-bit indication that up to $2^N$ next SPS occasions are to be skipped.

11. The method of claim 10, further comprising, based on the indication of the determination by the UE to skip the at least one SPS occasion, one or more of:
   foregoing receiving pose information from the UE over the at least one uplink resource of the at least one SPS occasion;
   foregoing transmitting a rendered data transmission to the UE over the at least one downlink resource of the at least one SPS occasion; or
   foregoing receiving hybrid automatic repeat request (HARQ) feedback for the rendered data transmission from the UE over the at least one uplink resource of the at least one SPS occasion.

12. The method of claim 10, further comprising:
   configuring a preconfigured uplink resource of an SPS occasion occurring prior to the at least one SPS occasion for transmission of the indication of the determination by the UE to skip the at least one SPS occasion, wherein the indication of the determination by the UE to skip the at least one SPS occasion is received over the preconfigured uplink resource.

13. The method of claim 10, wherein receiving the indication of the determination to skip the at least one SPS occasion includes receiving the indication of the determination to skip the at least one SPS occasion in an uplink transmission that includes hybrid automatic repeat request (HARQ) feedback for a physical downlink shared channel (PDSCH) transmission transmitted to the UE during an SPS occasion occurring prior to the at least one SPS occasion.

14. The method of claim 10, wherein receiving the indication of the determination to skip the at least one SPS occasion includes receiving the indication of the determination to skip the at least one SPS occasion in an uplink transmission from the UE that includes data other than pose information, wherein the uplink transmission is transmitted by the UE to the base station during an SPS occasion occurring prior to the at least one SPS occasion, wherein the uplink transmission includes one or more of:
   a physical uplink control channel (PUCCH) transmission; or
   a physical uplink shared channel (PUSCH) transmission.

15. The method of claim 10, wherein pose information associated with the UE includes one or more of location information, position information, or orientation information associated with the UE.

16. A user equipment (UE) comprising:
   a memory; and
   at least one processor coupled to the memory, wherein the UE is configured to:
      determine, based on pose information associated with the UE, to skip at least one semi-persistent scheduling (SPS) occasion configured for the UE with at least one downlink resource and at least one uplink resource; and
      transmit, to a base station, an indication of the determination to skip the at least one SPS occasion.

17. The UE of claim 16, wherein, to skip skipping the at least one SPS occasion, the UE is configured to:
   forego transmission of the pose information to the base station over the at least one uplink resource of the at least one SPS occasion;
   forego reception of a rendered data transmission from the base station over the at least one downlink resource of the at least one SPS occasion;
   forego transmission of hybrid automatic repeat request (HARQ) feedback for the rendered data transmission to the base station over the at least one uplink resource of the at least one SPS occasion; or
   any combination thereof.

18. The UE of claim 16, wherein, to transmit the indication of the determination to skip the at least one SPS occasion, the UE is configured to transmit the indication of the determination to skip the at least one SPS occasion in a preconfigured uplink resource configured for transmission of the indication of the determination to skip the at least one SPS occasion, the preconfigured uplink resource belonging to an SPS occasion prior to the at least one SPS occasion.

19. The UE of claim 16, wherein, to transmit the indication of the determination to skip the at least one SPS occasion, the UE is configured to transmit the indication of the determination to skip the at least one SPS occasion in an uplink transmission that includes hybrid automatic repeat request (HARQ) feedback for a physical downlink shared channel (PDSCH) transmission received during an SPS occasion prior to the at least one SPS occasion.

20. The UE of claim 16, wherein, to transmit the indication of the determination to skip the at least one SPS occasion, the UE is configured to transmit, during an SPS occasion occurring prior to the at least one SPS occasion, the indication of the determination to skip the at least one SPS occasion in an uplink transmission that includes data other than pose information, wherein the uplink transmission includes one or more of:
  a physical uplink control channel (PUCCH) transmission; or
  a physical uplink shared channel (PUSCH) transmission.

21. The UE of claim 16, wherein the pose information associated with the UE include predictive pose information indicating expected pose information for a subsequent time, and wherein, to determine to skip the at least one SPS occasion, the UE is configured to determine, based on the predictive pose information, to forego transmission of the predictive pose information to the base station at least a period of time prior to the subsequent time.

22. The UE of claim 16, wherein, to transmit the indication of the determination to skip the at least one SPS occasion, the UE is configured to transmit the indication of the determination to skip the at least one SPS occasion during an SPS occasion occurring prior to the at least one SPS occasion, and wherein the indication of the determination to skip the at least one SPS occasion includes one or more of:
  a one-bit indication that a next SPS occasion is to be skipped; or
  an N-bit indication that up to $2^N$ next SPS occasions are to be skipped.

23. The UE of claim 16, wherein, to skip the at least one SPS occasion, the UE is configured to forego transmission of the pose information to the base station over the at least one uplink resource of the at least one SPS occasion.

24. The UE of claim 16, wherein, to skip the at least one SPS occasion, the UE is configured to forego reception of a rendered data transmission from the base station over the at least one downlink resource of the at least one SPS occasion.

25. The UE of claim 16, wherein, to skip the at least one SPS occasion, the UE is configured to forego transmission of hybrid automatic repeat request (HARQ) feedback for the rendered data transmission to the base station over the at least one uplink resource of the at least one SPS occasion.

26. The UE of claim 16, wherein, to transmit the indication of the determination to skip the at least one SPS occasion, the UE is configured to transmit the indication of the determination to skip the at least one SPS occasion in an uplink transmission that includes hybrid automatic repeat request (HARQ) feedback.

27. The UE of claim 16, wherein the pose information associated with the UE include predictive pose information indicating expected pose information for a subsequent time.

28. The UE of claim 27, wherein, to determine to skip the at least one SPS occasion, the UE is configured to determine, based on the predictive pose information, to skip the at least one SPS occasion.

29. The UE of claim 28, wherein, to skip the at least one SPS occasion, the UE is configured to forego transmission of the predictive pose information to the base station at least a period of time prior to the subsequent time.

30. The UE of claim 16, wherein the indication of the determination to skip the at least one SPS occasion includes one or more of:
  a one-bit indication that a next SPS occasion is to be skipped; or
  an N-bit indication that up to $2^N$ next SPS occasions are to be skipped.

31. The UE of claim 16, wherein the indication of the determination to skip the at least one SPS occasion includes a one-bit indication that a next SPS occasion is to be skipped.

32. The UE of claim 16, wherein the indication of the determination to skip the at least one SPS occasion includes an N-bit indication that up to $^2N$ next SPS occasions are to be skipped.

33. The UE of claim 16, wherein the pose information associated with the UE includes one or more of location information, position information, or orientation information associated with the UE.

34. A base station comprising:
  a memory; and
  at least one processor coupled to the memory, wherein the base station is configured to:
    receive, from a user equipment (UE) during a semi-persistent scheduling (SPS) occasion prior to at least one SPS occasion, an indication of a determination by the UE to skip the at least one SPS occasion configured for the UE with at least one downlink resource and at least one uplink resource; and
    reallocate, based on the indication of the determination by the UE to skip the at least one SPS occasion, one or more of the at least one downlink resource or the at least one uplink resource, wherein the indication of the determination to skip the at least one SPS occasion includes one or more of:
      a one-bit indication that a next SPS occasion is to be skipped; or
      an N-bit indication that up to $2^N$ next SPS occasions are to be skipped.

35. The base station of claim 34, wherein, based on the indication of the determination by the UE to skip the at least one SPS occasion, the base station is configured to:
  forego reception of pose information from the UE over the at least one uplink resource of the at least one SPS occasion;
  forego transmission of a rendered data transmission to the UE over the at least one downlink resource of the at least one SPS occasion; forego reception of foregoing receiving hybrid automatic repeat request (HARQ) feedback for the rendered data transmission from the UE over the at least one uplink resource of the at least one SPS occasion; or
  any combination thereof.

36. A base station comprising:
  a memory; and at least one processor coupled to the memory, wherein the base station is configured to:

receive, from a user equipment (UE) over a preconfigured uplink resource, an indication of a determination by the UE to skip at least one semi-persistent scheduling (SPS) occasion configured for the UE with at least one downlink resource and at least one uplink resource;

reallocate, based on the indication of the determination by the UE to skip the at least one SPS occasion, one or more of the at least one downlink resource or the at least one uplink resource; and configure the preconfigured uplink resource of an SPS occasion prior to the at least one SPS occasion for transmission of the indication of the determination by the UE to skip the at least one SPS occasion.

37. A base station comprising:

a memory; and at least one processor coupled to the memory, wherein the base station is configured to:

receive, from a user equipment (UE) in an uplink transmission that includes hybrid automatic repeat request (HARQ) feedback for a physical downlink shared channel (PDSCH) transmission transmitted to the UE during a semi-persistent scheduling (SPS) occasion prior to at least one SPS occasion, an indication of a determination by the UE to skip the at least one SPS occasion configured for the UE with at least one downlink resource and at least one uplink resource; and reallocate, based on the indication of the determination by the UE to skip the at least one SPS occasion, one or more of the at least one downlink resource or the at least one uplink resource.

38. A base station comprising:

a memory; and at least one processor coupled to the memory, wherein the base station is configured to:

receive, from a user equipment (UE) in an uplink transmission during a semi-persistent scheduling (SPS) occasion prior to at least one SPS occasion, an indication of a determination by the UE to skip the at least one SPS occasion configured for the UE with at least one downlink resource and at least one uplink resource, wherein the uplink transmission includes data other than pose information; and reallocate, based on the indication of the determination by the UE to skip the at least one SPS occasion, one or more of the at least one downlink resource or the at least one uplink resource, wherein the uplink transmission includes one or more of:

a physical uplink control channel (PUCCH) transmission; or a physical uplink shared channel (PUSCH) transmission.

* * * * *